(12) United States Patent
Dautel et al.

(10) Patent No.: US 8,722,318 B2
(45) Date of Patent: May 13, 2014

(54) METHODS OF PHOTOCHEMICAL HYDROLYSIS-POLYCONDENSATION OF CROSS-LINKABLE CHROMOPHORES WITH STERIC HINDRANCE, CATALYSED BY A PHOTOGENERATED ACID, AND THE APPLICATIONS THEREOF

(75) Inventors: Olivier Dautel, Montpellier (FR); Joel Moreau, Montpellier (FR); Jean-Pierre Lere-Porte, Montpellier (FR)

(73) Assignees: Centre National de la Recherche Scientifique-CNRS, Paris Cedex (FR); Universite Montpellier 2, Montpellier (FR); Ecole Nationale Superieure de Chimie, Montpellier (FR)

(*) Notice: Subject to any disclaimer, the term of this patent is extended or adjusted under 35 U.S.C. 154(b) by 225 days.

(21) Appl. No.: 13/063,892

(22) PCT Filed: Sep. 15, 2009

(86) PCT No.: PCT/FR2009/051734
§ 371 (c)(1),
(2), (4) Date: Jun. 3, 2011

(87) PCT Pub. No.: WO2010/029273
PCT Pub. Date: Mar. 18, 2010

(65) Prior Publication Data
US 2011/0229821 A1    Sep. 22, 2011

(30) Foreign Application Priority Data
Sep. 15, 2008  (FR) .......................... 08 56199

(51) Int. Cl.
*G03F 7/26*    (2006.01)
*C08G 73/00*   (2006.01)
*C08G 77/00*   (2006.01)
*C09D 179/08*  (2006.01)
*C09D 183/14*  (2006.01)

(52) U.S. Cl.
USPC ............. 430/322; 430/270.1; 522/31; 522/59

(58) Field of Classification Search
USPC ................... 430/270.1, 322, 325; 522/31, 59
See application file for complete search history.

(56) References Cited

U.S. PATENT DOCUMENTS

| 6,664,021 B1 * | 12/2003 | Maeda et al. ............. 430/270.1 |
| 2004/0096773 A1 | 5/2004 | Jung et al. |
| 2008/0227025 A1 * | 9/2008 | Kanda ....................... 430/270.1 |

FOREIGN PATENT DOCUMENTS

| EP | 0 957 124 | 11/1999 |
| EP | 1 788 012 | 5/2007 |
| EP | 1 867 681 | 12/2007 |
| EP | 1 942 150 | 7/2008 |

OTHER PUBLICATIONS

Corriu et al., Chem. Commun., pp. 1845-1846 (1996).
Corriu et al., Chem. Mater., 4(6):1217-1224 (1992).
Dantas et al., Adv. Mater., 11:107-112 (1999).
Dautel et al., J. Am. Chem. Soc., 128:4892-4901 (2006).
Doshi et al., Science, 290:107-111 (2000).

(Continued)

*Primary Examiner* — Brittany Raymond
(74) *Attorney, Agent, or Firm* — McAndrews, Held & Malloy, Ltd.

(57) ABSTRACT

The invention relates to a process for the hydrolysis-polycondensation of a sterically hindered crosslinkable chromophore, characterized in that the hydrolysis-polycondensation is catalyzed with an acid released by a photoacid generator (PAG).

17 Claims, 6 Drawing Sheets

(56) References Cited

OTHER PUBLICATIONS

Dunn et al., Proc. SPIE Int. Soc. Opt. Eng., 1328:174-182 (1990).
International Search Report in PCT/FR2009/051734, dated Jan. 7, 2010.
Kani et al., J. Polym. Sci. A: Polym. Chem., 35:2355-2364 (1997).
Kowalewska, J. Mat. Chem., 15:4997-5006 (2005).
Lu et al., Nature, 410:913-917 (2001).
MacChesney, Proc. SPIE Int. Soc. Opt. Eng., 988:131-134 (1989).
Malval et al., Chem. Phys. Letters, 443:323-327 (2007).
Okamura et al., J. Photopolym. Sci. Tec., 16:87-90 (2003).
Prasad, Mater. Res. Soc. Symp. Proc., 180:741-746 (1990).
Riesfeld et al., Struct. Bonding, 49:1-36 (1982).
Sanchez et al., Adv. Mater., 15(23):1969-1994 (2003).
Schneider et al., Adv. Mater., 12:351-354 (2000).
Shea et al., J. Am. Chem. Soc., 114(17):6700-6710 (1992).
Wantz et al., Org. Elec., 7:38-44 (2006).
Yu et al., Chem. Commun., pp. 1503-1504 (1998).

* cited by examiner

METHODS OF PHOTOCHEMICAL HYDROLYSIS-POLYCONDENSATION OF CROSS-LINKABLE CHROMOPHORES WITH STERIC HINDRANCE, CATALYSED BY A PHOTOGENERATED ACID, AND THE APPLICATIONS THEREOF

The invention relates to the hydrolysis-polycondensation of crosslinkable chromophores catalyzed with a photogenerated acid. The invention also relates to the applications of this process, especially to photolithography.

Glasses obtained from the sol-gel process incorporating organic chromophores have numerous applications such as laser dyes, materials for nonlinear optics, biosensors or solar sensors[1]. The chromophores are incorporated into the inorganic matrix by physisorption. However, the incorporation of high concentrations of dyes or chromophores into a sol-gel matrix remains a great challenge. A major advance was made with the development of silsesquioxanes in which the organic fragment is covalently bonded to the silica network[2]. Thus, the sol-gel process offers the possibility of designing luminescent hybrid devices on the bases of functionalized alkoxysilanes. Dantas de Morais et al. have shown the value of the sol-gel process for producing organic-inorganic hybrid light-emitting diodes (HLEDs) in multilayer form composed of two or three layers[3]. The monofunctional precursors were copolymerized in the presence of tetraethoxysilane (TEOS) used as crosslinking agent. In the same approach, Müllen et al. have reported the manufacture of light-emitting devices based on layers of hybrid perylenes[4]. However, to avoid aggregation of the chromophores and to obtain highly fluorescent materials, these silsesquioxane precursors needed to be diluted in a silica matrix by cocondensation with TEOS. According to these results, this approach appears to be promising for the manufacture of HLEDs. Such grafted active units have several advantages over purely organic materials such as polymers and organic molecules. They allow: efficient crosslinking via condensation reactions providing chemical and mechanical stability; the formation of insoluble films that allow the manufacture of multilayer devices; simple manufacturing processes by spin-coating. However, the final efficacy of HLEDs depends not only on the intrinsic quality and physicochemical response of the various charge carriers and of the luminescent layers, but also on the control of the deposition method.

There is thus a real need for processes for controlling this deposition method.

The present inventors have found that excellent control of the deposition method can be obtained by using a hydrolysis-polycondensation of sterically hindered crosslinked chromophores, which is catalyzed with a photogenerated acid.

Photoacid generators (PAGs), which undergo photochemical cleavage reactions to produce an acid, have been intensively used in imaging systems based on reactions induced or catalyzed with an acid, such as the polymerization of epoxides or the crosslinking of photosensitive resins[5]. Holdcroft et al. have used this type of catalyst (originally developed for the lithography of polystyrenes) to perform the photolithography of a polythiophene functionalized with the tetrahydropyranyl group[6]. The acid generated in the polythiophene film by photodecomposition of the PAG catalyzes the cleavage of the tetrahydropyranyl group. The polythiophene then becomes insoluble and allows the removal by washing of the non-irradiated zones. However, very few publications report the use of PAG as a catalyst for the sol-gel process. PAGs have been used to hydrolyze disiloxanes as precursors of silicon oxycarbide films[7] or for the photopatterning of mesoporous silica films[8]. However, the photopatterning of electroactive hybrid precursors has never been reported.

Thus, the present inventors found that it was possible to obtain thin films of very good quality via a process for the hydrolysis-polycondensation of crosslinkable sterically hindered chromophores, said process being catalyzed with a photoacid-generating (PAG) catalyst.

Figure 1:
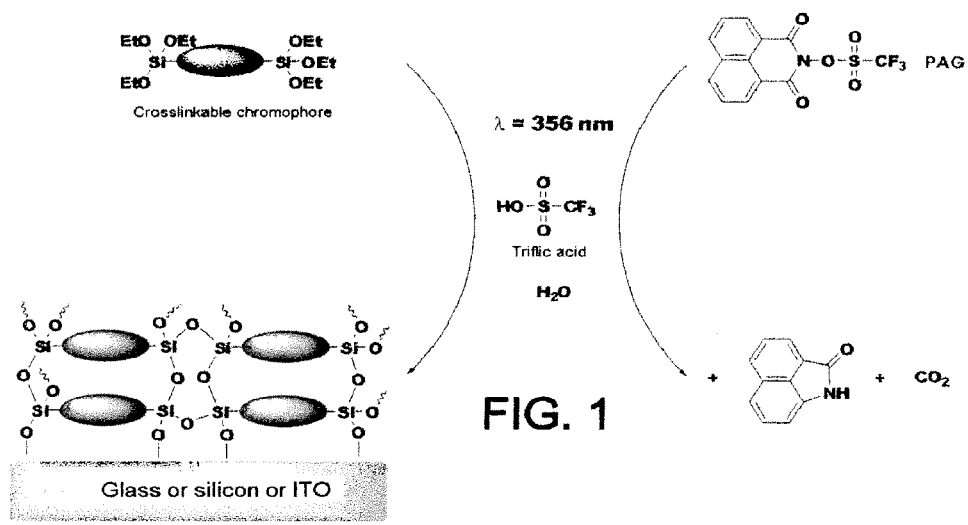
FIG. 1 depicts a schematic of a uniform film.

In the present patent application, the term "chromophore" means a molecule of pi type.

A molecule of pi type is composed of an atom or group of atoms through which electrons may be delocalized. Preferably, the orbitals allowing this delocalization are the p orbitals of multiply bonded carbon atoms, for instance those of alkenes, alkynes, neutral or charged aromatic nuclei, or cyclic systems comprising heteroatoms.

The chromophore has a capacity for absorbing the energy of photons in the range of the visible spectrum, and so the delocalized electrons may come into resonance with the incident radiation. These molecules will thus change color in response to the light excitation.

The chromophore shows optoelectronic properties, and so is used for the manufacture of electronic components that emit or interact with light, and it allows the optical signals to be conveyed, memorized and amplified by purely optical means.

In the present invention, the chromophore comprises at least one hydrolyzable and polycondensable group, of the type $M(OR^1)n$, M representing a metal from group III or IV of the Periodic Table, $R^1$ representing a $C_1$-$C_4$ alkyl and n being an integer between 1 and 5.

Given the presence of this group, of the type $M(OR^1)_n$, the chromophore according to the invention is said to be "crosslinkable", the crosslinking being performed by hydrolysis and polycondensation, creating covalent bonds between different chromophore molecules.

The crosslinkable chromophore is also termed as being "sterically hindered" since it comprises, between the pi-conjugated system and the crosslinkable group, a sterically hindered group. The introduction of this sterically hindered group makes it possible to avoid aggregation of a chromophore in the material produced by hydrolysis-polycondensation catalyzed with a photogenerated acid. This sterically hindered group does not interfere with the pi-conjugated system. It may be chosen from:

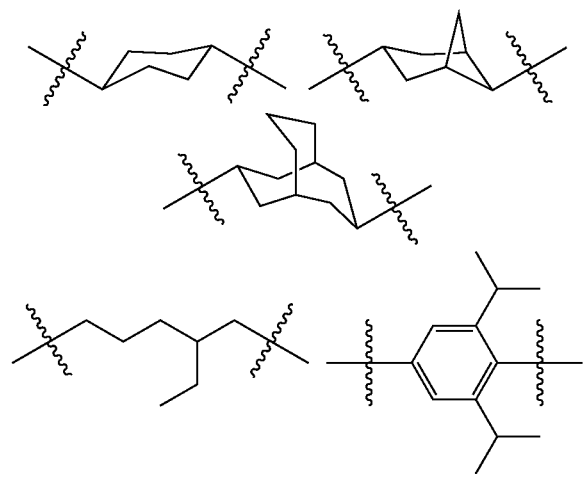

According to one particular embodiment of the process of the invention, the crosslinkable sterically hindered chromophore is chosen from those represented by one of the formulae below:

formula (I):

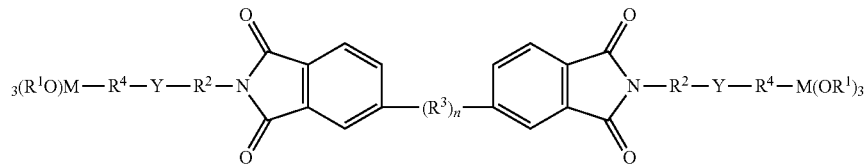

formula (II):

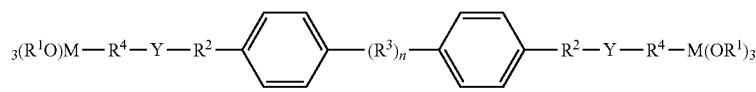

in which
$R^1$ represents $C_1$-$C_4$ alkyl;
$R^2$ represents a sterically hindered group;
$R^3$ represents a pi-conjugated system;
Y represents O, S or NH or is absent;
$R^4$ represents a $C_3$-$C_{18}$, preferably $C_3$-$C_8$ and more preferentially $C_3$ alkyl group.
M represents a metal from group III or IV of the Periodic Table;
n is an integer.
The crosslinkable chromophore is either a polymer or an oligomer, depending on the value of the integer n. The integer n may be between 1 and 10 000, preferably between 1 and 100 and even more preferentially between 1 and 20. However, it is easier to work with oligomers or small polymers for which n is between 1 and 19, preferably between 1 and 15 and even more preferentially between 1 and 10.

The term "$C_1$-$C_4$ alkyl" means methyl, ethyl, n-propyl, isopropyl, n-butyl, isobutyl or tert-butyl.

Metals M that may be mentioned include Si, Ti, Zr, Sn, Al. Preferably, M is Si.

The presence of the sterically hindered group $R^2$ makes it possible to obtain very uniform thin films.

As examples of sterically hindered groups $R^2$, mention may be made of the groups chosen from the group comprising:

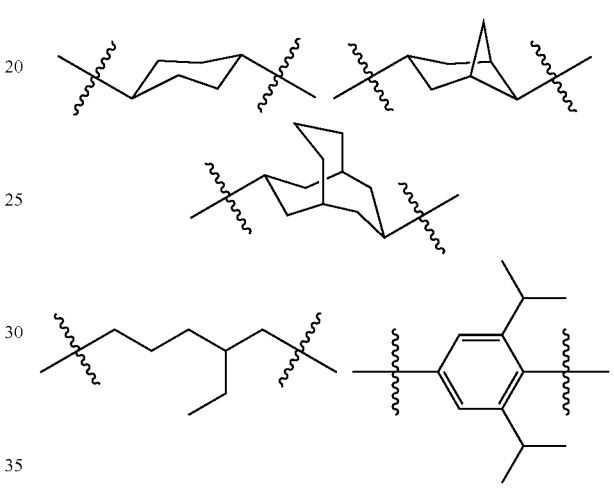

As examples of pi-conjugated systems $R^3$, mention may be made of those chosen from the group comprising:

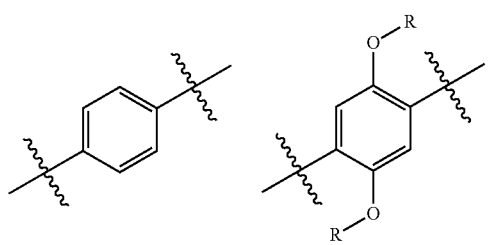

-continued

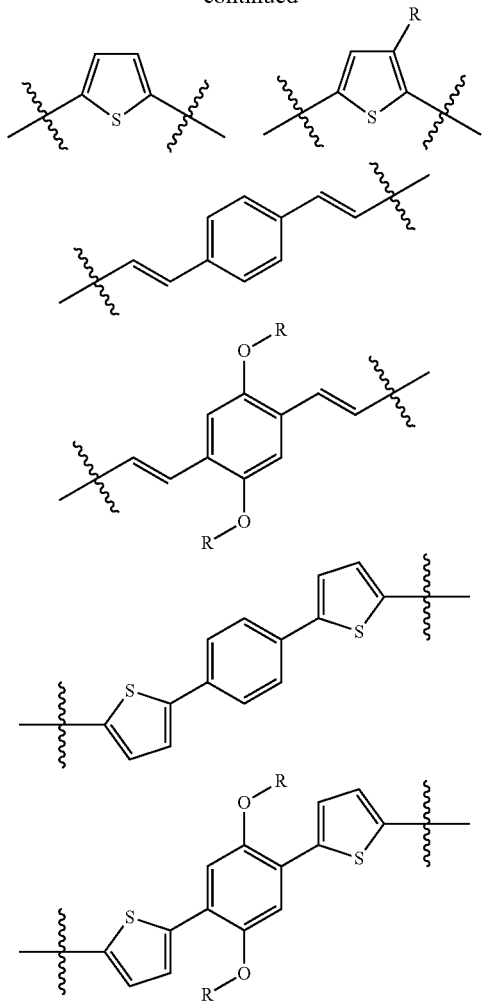

with R representing H or a $C_1$-$C_{18}$, preferably $C_1$-$C_{12}$ and even more preferentially $C_1$-$C_6$ alkyl group, said alkyl group being optionally branched or substituted with a heteroatom (O, S, N, etc.).

These novel chromophores are prepared by insertion of a sterically hindered group between the pi-conjugated system and the group $M(OR^1)_3$, via a group —$YR^4$—.

The synthesis of the chromophores of formula (I) is described in patent application FR 08/56179 in the name of the Applicant, filed on Sep. 15, 2008.

The synthesis scheme envisioned for the chromophores of formula (II) is as follows:

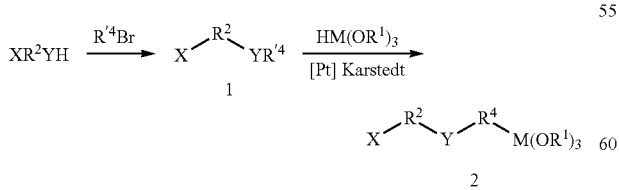

$R^1$, $R^2$, Y and $R^4$ being as defined above, X being a halogen (Br, Cl or I) and $R'^4$ representing an alkyl group containing the same number of atoms as the group $R^4$ and being ethylenically unsaturated.

This synthesis method is particularly suited to the introduction of sterically hindered groups $R^2$ of aromatic type. Its introduction is preferentially performed by means of a halogenated derivative X—$R^2$—YH, (X, Y and $R^2$ being as defined above), which is preferably a halogenated phenol derivative of the type X—$R^2$—OH or a halogenated aniline derivative of the type X—$R^2$—$NH_2$.

Thus, the synthesis may be performed starting with a halogenated phenol derivative of the type X—$R^2$—OH, according to the following reaction scheme:

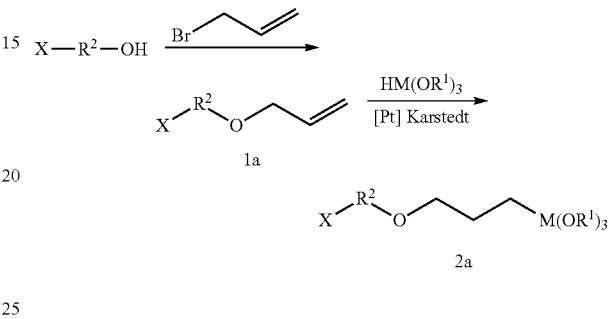

The allylation of the phenol function is performed with allyl bromide in the presence of a base to give 1a. Hydrosilylation of the vinyl function with $HM(OR)_3$ catalyzed with the Karstedt catalyst gives the intermediate 2a.

Examples of envisioned 4-halophenols are given below:

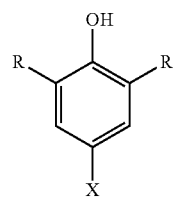

4-halo-2,6-alkylphenol

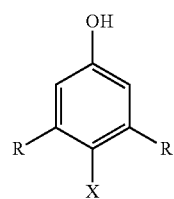

4-halo-3,5-alkylphenol
with X=I, Br, Cl

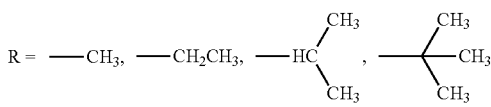

The synthesis may also be performed starting with a halogenated aniline derivative of the type X—$R^2$—$NH_2$, according to the following reaction scheme:

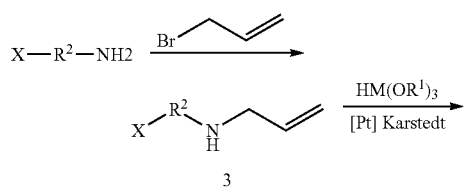

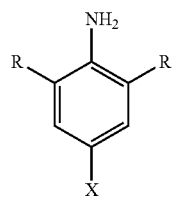

Allylation of the amine function is performed by heating at 120° C. for 2 days of an equimolar mixture of halogenoaniline and of allyl bromide. Hydrosilylation of the vinyl function with HM(OR$^1$)$_3$ catalyzed with the Karstedt catalyst gives the intermediate 4.

Examples of envisioned 4-halogenoanilines are as follows:

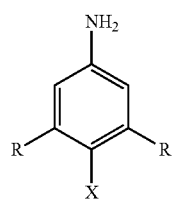

4-halogeno-2,6-alkylaniline

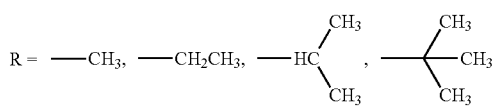

4-halogeno-3,5-alkylaniline
with X=I, Br, Cl

R = —CH$_3$, —CH$_2$CH$_3$, —HC(CH$_3$)(CH$_3$), —C(CH$_3$)$_2$CH$_3$

Finally, the two trialkoxy-metallated intermediates 2 or 2a and 4 are used in an organometallic coupling with the pi-conjugated system, as is described in the patent application Ser. No. 08/56,179 mentioned above.

The process in accordance with the invention is particularly suited to the hydrolysis-polycondensation of the chromophores described in the patent application FR 08/56179 mentioned above.

More particularly, the process is used on silyl chromophores, i.e. chromophores of formula formula (I'):

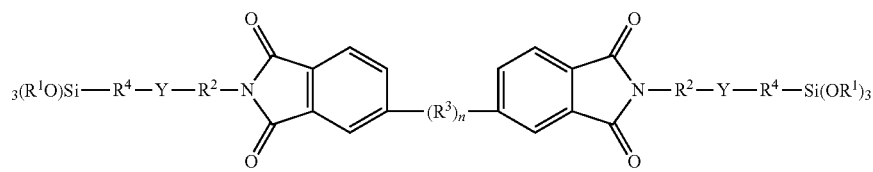

formula (II"):

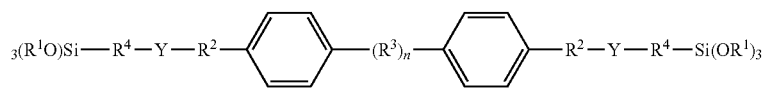

R$^1$, R$^2$, R$^3$, R$^4$, Y and n being as defined above.

According to one particular embodiment, the silyl chromophore is 5,5'-(1E,1E')-2,2'-(2,5-bis(octyloxy)-1,4-phenylene)bis(ethene-2,1-diyl)bis(2-(4-(3-(triethoxysilyl)propoxy)cyclohexyl)isoindoline-1,3-dione), the synthesis of which is described in the patent application in the name of the Applicant mentioned above.

The PAG is chosen, on the one hand, for its capacity to be photodecomposed under UV irradiation, forming at least one acid, and, on the other hand, for its capacity to catalyze the hydrolysis and polycondensation of the functions -M(OR$^1$)$_3$. The hydrolysis reaction may take place solely with atmospheric moisture without addition of additional water.

According to one particular embodiment of the process of the invention, the PAG is chosen from the group comprising fluoroalkylsulfonyloxy derivatives and iodonium salts.

The fluoroalkylsulfonyloxy derivatives that may be used as PAG in the process of the invention are chosen from the group comprising:

N-trifluoromethylsulfonyloxy-1,8-naphthalimide (NIOTf) of formula:

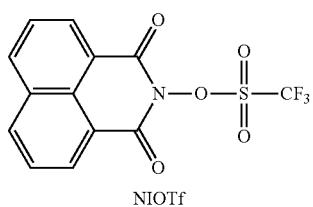 [SMILES: O=C1c2cccc3cccc(c23)C(=O)N1OS(=O)(=O)C(F)(F)F]

NIOTf the NIOTf derivatives of formulae:

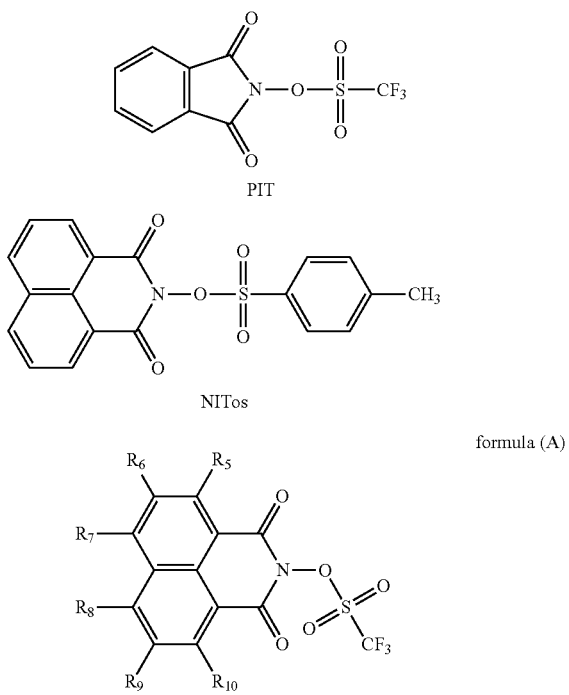

with $R_5$ to $R_{10}$, independently of each other, possibly being chosen from:

H; $CH_3$; $C_5$ to $C_{20}$ alkyl; (linear $C_1$ to $C_4$ alkyl)-C≡C—, preferably $CH_3$—C≡C—; ($C_1$ to $C_4$ alkyl)$_2$-CH—C≡C—; ($C_1$ to $C_4$ alkyl)$_3$-C—C≡C—, preferably $(CH_3)_3$—C—C≡C—; ($C_1$ to $C_4$ alkyl)$_3$-Si—C≡C—, preferably

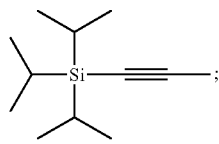

and other compounds of formulae:

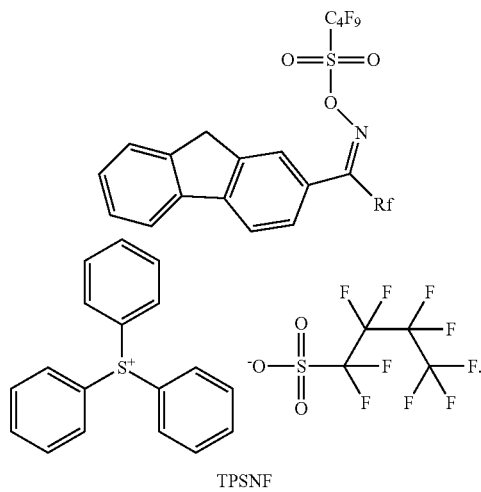

| Rf | |
|---|---|
| -$C_3F_7$ | HNBF |
| -$C_4F_8H$ | ONPF |
| -$C_6F_{12}H$ | DNHF |

The iodonium salts that may be used as PAG in the process of the invention are chosen from the group comprising $Ph_2IB$ $(C_6H_5)_4$, $Ph_2IOSO_2CF_3$, $Ph_2ISbF_6$ and $Ph_2IBF_4$, and mixtures thereof.

In the case where the process of the invention is intended for the optoelectronics field, the iodonium salts[9], although more conventionally used as PAGs, are not preferred since they entail the risk of exciton quenching.

A PAG that is preferred in the process of the invention is NIOTf since this neutral organic molecule can undergo homolytic photocleavage of its N—O bond to produce benzo [cd]indol-2(1H)-one (BIONE), $CO_2$ and trifluoromethanesulfonic acid[11]. In addition, this photoacid generator has strong absorption at 350 nm, a spectral region in which the absorption of 5,5'-(1E,1'E)-2,2'-(2,5-bis(octyloxy)-1,4-phenylene)bis(ethene-2,1-diyl)bis(2-(4-(3-(triethoxysilyl)propoxy)cyclohexyl)isoindoline-1,3-dione) 6 is low. Thus, according to one particular embodiment, the present invention relates to the process for the hydrolysis-polycondensation of 5,5'-(1E,1'E)-2,2'-(2,5-bis(octyloxy)-1,4-phenylene) bis(ethene-2,1-diyl)bis(2-(4-(3-(triethoxysilyl)propoxy) cyclohexyl)isoindoline-1,3-dione) using NIOTf as PAG.

An NIOTf derivative (formula (A)) may also be used:

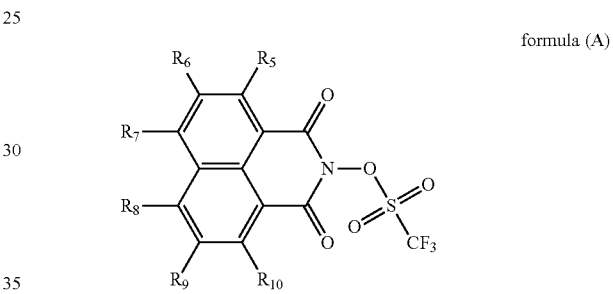

formula (A)

with $R_5$ to $R_{10}$, independently of each other, possibly being chosen from:

H; $CH_3$; $C_5$ to $C_{20}$ alkyl; (linear $C_1$ to $C_4$ alkyl)-C≡C—, preferably $CH_3$—C≡C—; ($C_1$ to $C_4$ alkyl)$_2$-CH—C≡C—; ($C_1$ to $C_4$ alkyl)$_3$-C—C≡C—, preferably $(CH_3)_3$—C—C≡C—; ($C_1$ to $C_4$ alkyl)$_3$-Si—C≡C—, preferably

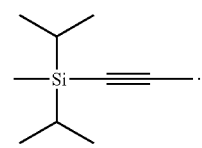

Among these PAGs of formula (A), the NIOTf derivative of formula (A) in which $R_7$ is triisopropyl-Si—C≡C—, which is known as TIPSA-NIOTf and which has the formula below:

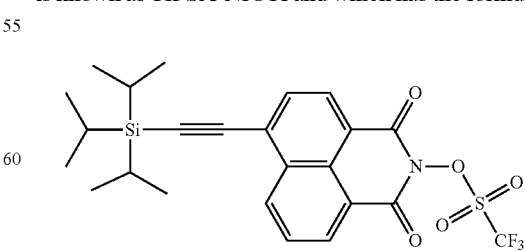

TIPSA-NIOTf is morn particularly preferred.

This novel PAG, TIPSA-NIOTf, is synthesized in three steps from 4-bromonaphthalic anhydride. In a first step, the triisopropylsilyl group is introduced by means of a Sonogashira coupling with an excess of triisopropylsilylacetylene. The N-hydroxylated imide function is generated by condensation of hydroxylamine hydrochloride and the silylated anhydride in the presence of pyridine. Finally, the addition of trifluoromethanesulfonyl chloride makes it possible to obtain TIPSA-NIOTf in good yields.

Thus, the reaction scheme for the synthesis of TIPSA-NIOTf may be as follows:

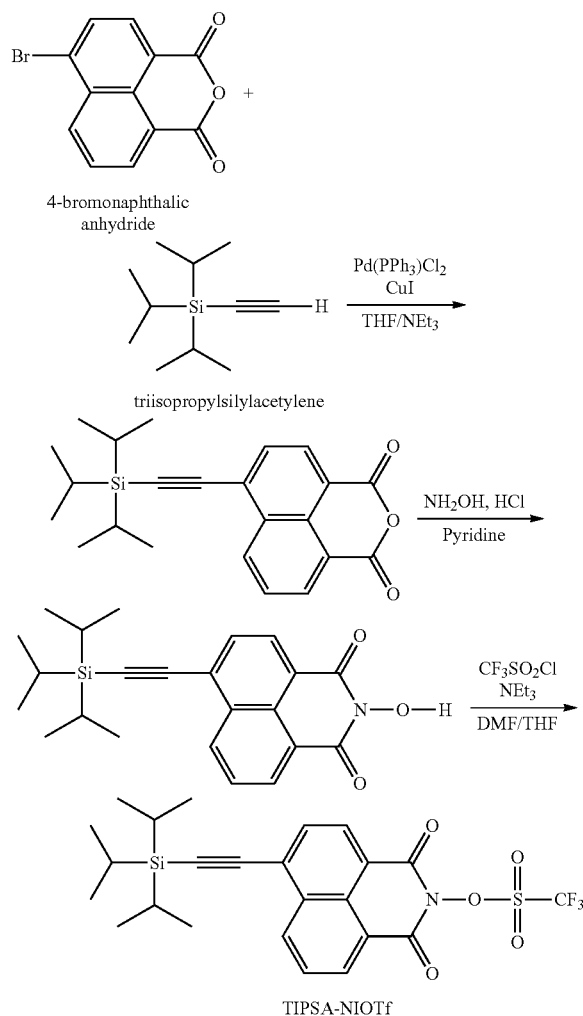

The amount of PAG and the energy supplied by the UV irradiation are chosen such that they are sufficient to allow the desired polycondensation. According to one particular embodiment, the amount of PAG is between 0.01% and 100%, preferably between 10% and 60% and even more preferentially about 50%, the percentages being molar percentages relative to the number of moles of crosslinkable chromophore. When a PAG of formula (A) and more particularly TIPSA-NIOTf is used as PAG, the amount required to hydrolyze and polycondense the film is less than that required for the other PAGs. Thus, the amount of PAG of formula (A) and especially the TIPSA-NIOTf used is between 0.01% and 50%, preferably between 0.01% and 20%, even more preferentially between 0.01% and 5% and more preferentially still between 0.01% and 1%.

The irradiation is performed using a broad-band UV lamp (200-600 nm, 150 mW/cm$^2$). The UV irradiation is preferably performed by filtering out the far UV (<300 nm) and at relatively low irradiation doses of about 80 to 200 mJ/cm$^2$ and preferably of about 100 to 150 mJ/cm$^2$. Filtration of the far UV may be performed by any means. A very simple means involves placing a glass plate between the UV lamp and the zone to be irradiated.

Since the hydrolysis-polycondensation is a catalyzed reaction, relatively low irradiation doses are sufficient. The use of low irradiation doses has the advantage of limiting the photooxidation of the chromophore.

According to one particular embodiment of the process of the invention, the crosslinkable chromophore is applied to a support chosen from the group comprising glass, silicon and tin-doped indium oxide (ITO, Indium Tin Oxide).

The choice of support will obviously depend on the applications of the product.

According to another embodiment, the process of the invention comprises the following steps:
selection of a support;
application of the sterically hindered crosslinkable chromophore to one face of the support;
application of the PAG to said face of the support;
UV irradiation;
optionally, annealing;
optionally, removal of the unreacted PAG and of its photodecomposition products.

Conventionally, the application of the crosslinkable chromophore may take place by spin-coating. The support is chosen as described previously.

The steps of application of the crosslinkable chromophore and of application of the PAG to the support may be performed simultaneously. In this case, the crosslinkable chromophore and the PAG are dissolved in the same solvent and then applied, for example by spin-coating, onto the support.

According to another embodiment, the two applications may be performed successively. Thus, the crosslinkable chromophore may be applied first, and then the PAG is applied onto the coat thus formed. The present inventors have found that the PAG acts as a protector for the crosslinkable chromophore against UV radiation and thus protects it from photobleaching. It is moreover very easy to remove by washing. The solvents used for the washing are chosen as a function of the PAG used. Mention may be made of THF, dioxane, acetone, methyl ethyl ketone, dichloromethane, hexane, cyclohexane, ethanol, used alone or as a mixture.

The process in accordance with the invention allows the production of perfectly uniform fluorescent thin films. Without wishing to be bound by any theory, the inventors are of the opinion that this homogeneity is due to the fact that the sterically hindered groups of the crosslinkable chromophore prevent overlap of the chromophores, which remain in a supramolecular aggregation of J type. The mechanical and chemical stability of the films obtained allows repeated deposition of films endowed with various optoelectronic properties for the manufacture of multilayer devices.

Given the fact that, by means of the process of the invention, the hydrolysis-polycondensation may be performed in a perfectly controlled manner by UV irradiation, it may be applied to photolithography on thin films of the precursor, i.e. of the sterically hindered crosslinkable chromophore.

The process of the invention may thus make it possible to perform photolithography with great precision. Thus, another subject of the present invention is a photolithography process comprising the steps of:

selection of a support;
application of the sterically hindered crosslinkable chromophore and of the PAG to one face of the support;
application of a mask to the face of the support comprising the chromophore and the PAG;
UV irradiation;
optionally, annealing;
removal of the PAG and of its photodecomposition products and of the unreacted crosslinkable chromophore.

Advantageously, the PAG used in the photolithography process is the PAG of formula (A), more particularly TIPSA-NIOTf.

As described previously, the application of the crosslinkable chromophore and of the PAG may be performed simultaneously or separately. The respective amounts are those mentioned previously. The choice of support is as described previously.

The process may optionally comprise an annealing step that is performed at temperatures comprised between 40 and 80° C., preferably between 50 and 70° C. and even more preferentially at about 60° C. The duration of the annealing may be determined by a person skilled in the art as a function of the nature of the various constituents. Generally, the annealing will be performed for 5 minutes to 60 minutes, preferably 10 to 40 minutes and even more preferentially 15 to 30 minutes.

Only the nonmasked parts are irradiated, the nonirradiated crosslinkable chromophore, i.e. the nonpolycondensed chromophore, is removed by washing with the PAG, by means of suitable solvents. These solvents may be chosen from THF, acetone and ethanol, and mixtures thereof.

A subject of the invention is also a composition comprising the sterically hindered crosslinkable chromophore and the PAG dissolved in a solvent. The solvent is chosen from the group comprising THF, dioxane, acetone, methyl ethyl ketone, dichloromethane, hexane, cyclohexane, ethanol, and mixtures thereof. Preferably, the solvent is THF.

The composition of the invention may be used as a fluorescent invisible ink, which may be applied by ink-jet printing and which may be grafted onto a support, especially glass.

Thus, the present invention relates to a marking method comprising the application by inkjet printing onto a glass support of a composition comprising the sterically hindered crosslinkable chromophore and the PAG dissolved in a solvent, followed by UV irradiation. Advantageously, the PAG used in this marking method is a PAG of formula (A), more particularly TIPSA-NIOTf.

The mechanical and chemical stability of the films especially allows a repeated deposition of films endowed with complementary optoelectronic properties for the manufacture of multilayer devices. This process also allows the micropatterning of thin films endowed with optoelectronic activity by photolithography. The invention can thus have numerous applications, in the fields of materials chemistry and organic optoelectronics, especially for the manufacture of markers, sensors, light-emitting diodes, transistors and solar cells.

EXAMPLES

Example 1

A TIPSA-NIOTf PAG is prepared according to the following reaction scheme:

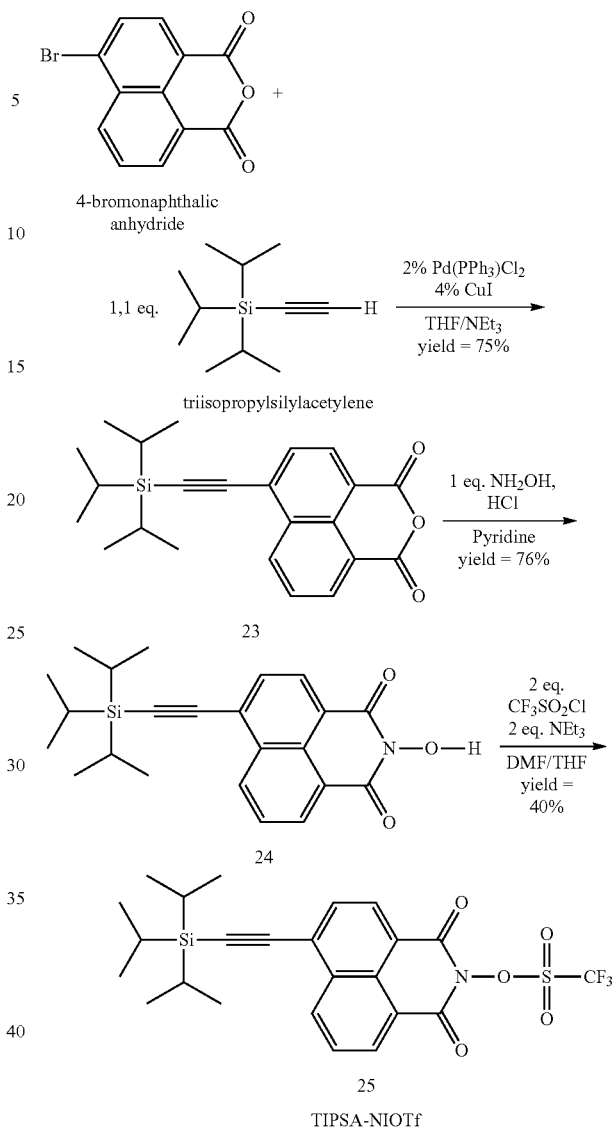

Example 2

A solution of 30 mg/ml of 5,5'-(1E,1'E)2,2'-(2,5-bis(octyloxy)1,4-phenylene)bis(ethene-2,1-diyl)bis(2-(4-(3-(triethoxysilyl)propoxy)cyclohexyl)isoindoline-1,3-dione) (compound 6) in THF was prepared according to Example 1 of patent application FR 08/56179 mentioned previously.

Using this solution, a 100 nm thin film was prepared by spin-coating onto a silicon wafer.

Figure 2A:
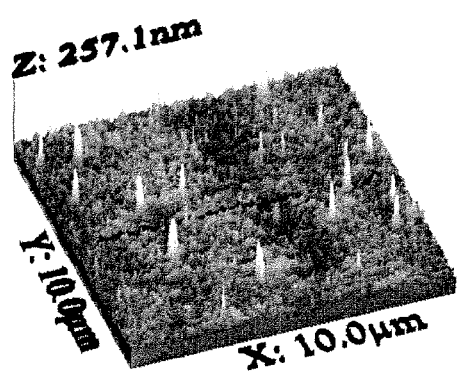
FIG. 2A depicts the topography image of a wafer of compound 6.
Figure 2B:
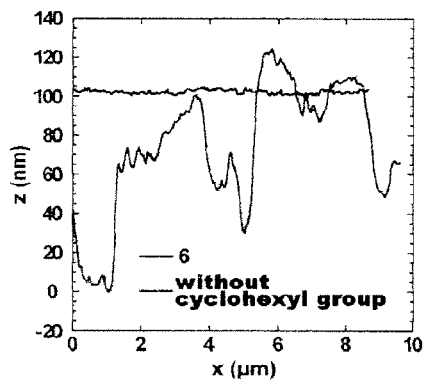
FIG. 2B depicts the topographic profile of the water depicted in FIG. 2A in comparison to a 100 nm film using a precursor not containing the cyclohexyl group.

A topographic study of layers spin-coated onto a silicon wafer was performed by atomic force microscopy (AFM) in tapping mode using a *Dimension* 3100 *Veeco Instruments* device. The topography image of the wafer of compound 6 is given in FIG. 2a and the topographic profile is given in FIG. 2b. The topographic profile of a 100 nm thick film using the precursor not containing the cyclohexyl group[10] is also given in FIG. 2b for comparative purposes.

The roughness of the film obtained with compound 6 as precursor is 1 nm. The comparative film is, itself, extremely heterogeneous; its roughness is 40 nm.

Example 3

A solution of the compound of formula 6 (30 mg/mL) and of 0.5 mol eq. of N-trifluoromethylsulfonyloxy-1,8-naphthalimide (NIOTf) in the THF was prepared. The solution stored protected from light is stable for several days.

A solution of the compound of formula 6 (30 mg/mL) in the THF was also prepared.

These solutions were deposited by spin-coating onto silicon wafers. A glass slide was placed over the thin films obtained to filter out the far-UV spectral range (<300 nm). The thin films were then exposed to a broad-band UV lamp (200-600 nm, 150 mW/cm$^2$) using a Fusion UV Curing Model F300S irradiation system. The irradiation was performed without any other precautions at room temperature and in air. The traces of water present in the atmosphere are sufficient to promote the hydrolysis of the groups Si(OEt)$_3$ in the siloxane thin film.

Figure 3:
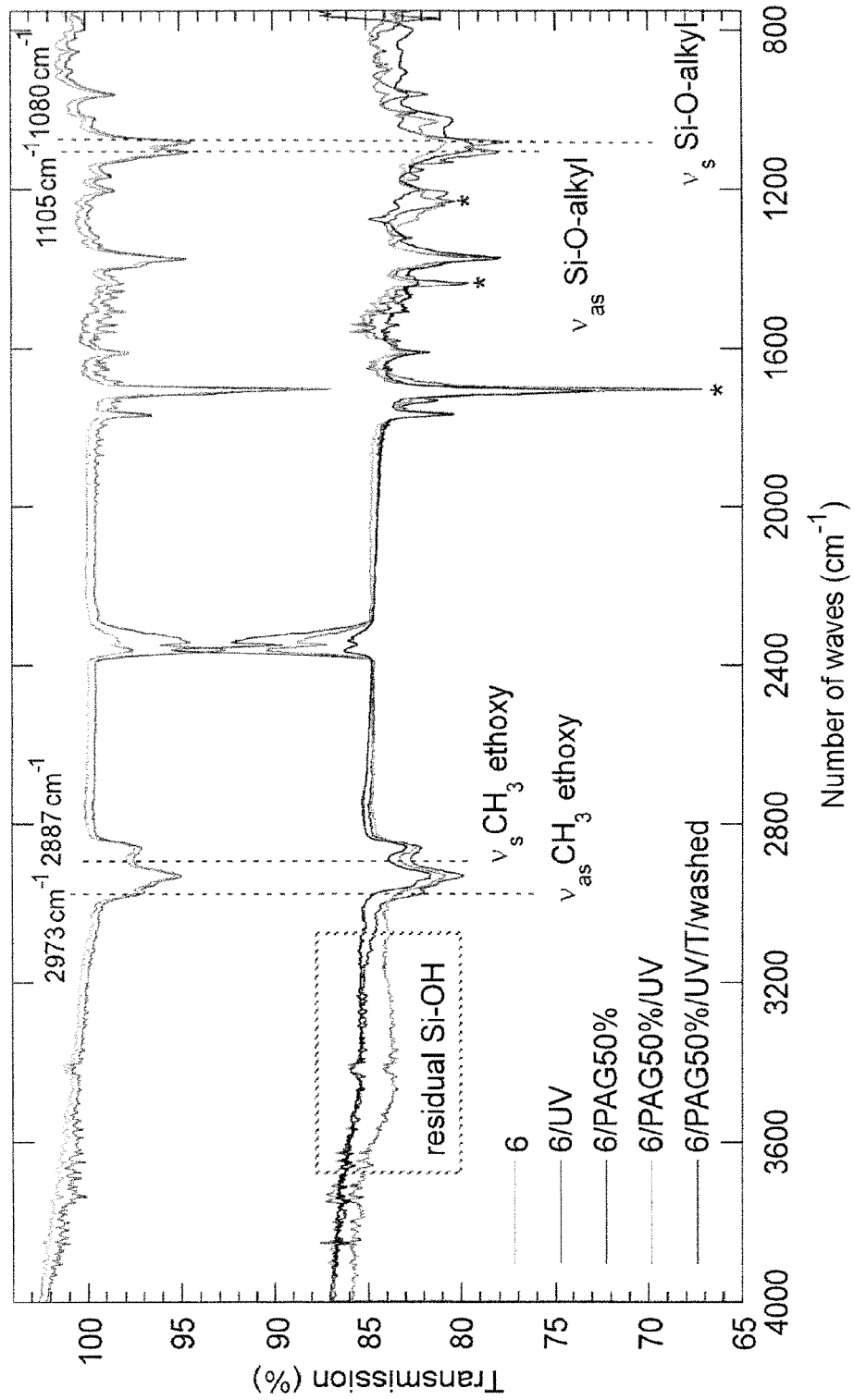
FIG. 3 depicts infrared spectra for various products.

The hydrolyis-polycondensation reaction was monitored by infrared spectroscopy. FIG. 3 shows the infrared spectra obtained for the following products:
- thin film comprising only compound 6, before UV irradiation (denoted as 6)
- thin film comprising only compound 6, after UV irradiation (denoted as 6/UV)
- thin film comprising compound 6 and 50% PAG, before UV irradiation (denoted as 6/PAG50%)
- thin film comprising compound 6 and 50% PAG, after UV irradiation (denoted as 6/PAG50%/UV)
- thin film comprising compound 6 and 50% PAG, after UV irradiation, annealed at 60° C. for 20 minutes and washed with THF, with ethanol and finally with acetone (denoted as 6/PAG50%/UV/washed).

During the hydrolysis-polycondensation reaction, the ethoxyl groups of 6 are removed while Si—O—Si bonds are created. This transformation may be demonstrated by monitoring the intensities of the absorption bands of the antisymmetric stretching vibrations ($v_{as}CH_3$) and symmetric stretching vibrations ($v_sCH_3$) of the $CH_3$ groups at 2973 and 2887 cm$^{-1}$, respectively (FIG. 3).

In the FTIR spectrum of 6/PAG50%/UV, these bands have completely disappeared (which is manifested by the decrease in intensity of the two strongest peaks), which is indicative of hydrolysis of the Si—OEt functions.

Similarly, the formation of the Si—O—Si network may be monitored by the decline in intensity of the antisymmetric vibration ($v_{as}Si$—O—$CH_2$) and symmetric vibration ($v_sSi$—O—$CH_2$) bands for the Si—O—$CH_2$ bonds, observed at 1105 and 1080 cm$^{-1}$, respectively, and also the appearance of a broad band from 1060 to 1160 cm$^{-1}$ corresponding to the antisymmetric and symmetric vibrations of the various Si—O—Si bonds of the silica network. Although Si—OH functions (vSiO—H at about 3400 cm$^{-1}$) may be observed in the FTIR spectrum of film 6/PAG50%/UV, the condensation may be optimized after 20 minutes of heat treatment at 60° C. This is confirmed by the stability of the film (6/PAG50%/UV/T/washed) following washing with various solvents and the absence of vSi—O—H at 3400 cm$^{-1}$. A first indication of the complete removal of the PAG and of its by-products during the washing is also given by the infrared study. Specifically, three additional vibration bands attributed to PAG may be observed in spectrum 6/PAG50% when compared with the spectrum of 6 alone (located at 1697, 1435 and 1225 cm$^{-1}$, denoted by a star in FIG. 3). These three bands completely disappeared after washing of the film (spectrum 6/PAG50%/UV/T/washed).

In the absence of PAG, the film of 6 is unaffected by the UV irradiation. In this case, the FTIR spectrum (6) is not modified by the irradiation. No hydrolysis of the triethoxysilane functions is detected in spectrum 6/UV.

Example 4

A solution of the compound of formula 6 (30 mg/mL) and of 2 mg of TIPSA-NIOTf in the THF was prepared. The solution stored protected from light is stable for several days.

A solution of the compound of formula 6 (30 mg/mL) in the THF was also prepared.

These solutions were deposited by spin-coating onto silicon wafers. A glass slide was placed over the thin films obtained to filter out the far-UV spectral range (<300 nm). The thin films were then exposed to a broad-band UV lamp (200-600 nm, 150 mW/cm$^2$) using a Fusion UV Curing Model F300S irradiation system. The irradiation was performed without any other precautions, at room temperature and in air. The traces of water present in the atmosphere are sufficient to promote the hydrolysis of the Si(OEt)$_3$ groups in the siloxane thin film.

Example 5

Thin films were prepared as in Example 3 above using glass slides as support. A thin film was also prepared for comparative purposes, using a solution comprising compound 6 and 50% TBAF.

Figure 4A:
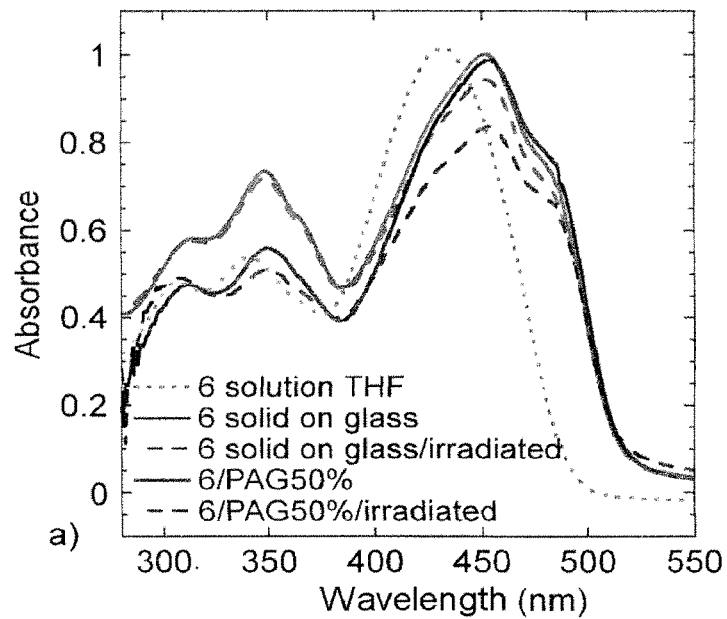
FIG. 4A depicts UV-visible absorption spectra for various products.

The UV-visible absorption (FIG. 4a) and emission (FIG. 4b) spectra of the following products were acquired:
- solution of compound 6 in THF (denoted as 6 solution THF)
- thin film comprising only compound 6, before UV irradiation (denoted as 6 solid on glass)
- thin film comprising only compound 6, after UV irradiation (denoted as 6 solid on glass/irradiated)
- thin film comprising compound 6 and 50% PAG, before UV irradiation (denoted as 6/PAG50%)
- thin film comprising compound 6 and 50% PAG, after UV irradiation (denoted as 6/PAG50%/irradiated)
- thin film comprising compound 6 and 50% TBAF.

The steric hindrance introduced by the triethoxysilane function and the cyclohexyl group directs the supramolecular organization of precursor 6 in the solid state toward an aggregation of J type. The red shift of the absorption maximum from 430 nm in the THF to 450 nm in the solid state (FIG. 4a) is coherent with the exciton coupling of aromatic groups in this type of organization. This precursor remains highly fluorescent in the solid state[10]. Although the hydrolysis-polycondensation leads to the removal of the ethoxyls and to the formation of Si—O—Si bonds, the bulk of the cyclohexyl function prevents overlap of the chromophores, which remain in a J aggregation.

It is important to note that the presence of PAG in the film of 6 constitutes protection against photooxidation of the chromophore. Whereas the irradiation (100 mJ/cm$^2$) of 6 (30 mg/mL) deposited onto a glass slide causes a dramatic drop in the intensities of the absorption and emission bands (FIGS. 4a and 4b, curves "6 solid on glass" and "6 solid on glass/irradiated") (50% of the fluorescence intensity is lost by photobleaching), in the presence of 0.5 eq. of PAG, the absorption band of the chromophore is virtually unaffected (FIGS. 4a and 4b, curves "6/PAG50%", "6/PAG50%/irradiated" and "6/PAG50%/irradiated/washed"). On account of the presence of PAG acting as an optical filter, the fluorescence intensity of a film of 6/PAG50% is much lower than that of a film of 6.

Figure 4B:
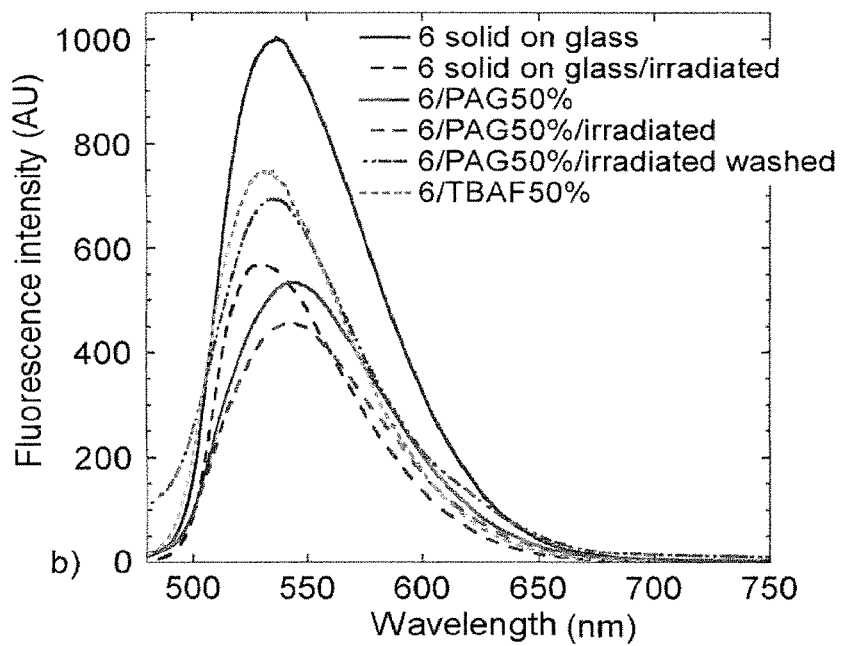
FIG. 4B depicts UV-visible emission spectra for various products.

Only 10% of the fluorescence is lost during the irradiation and, even more interestingly, washing of the film 6/PAG50%/UV not only removes the PAG and its residues, but also makes it possible to obtain the same emission properties as the materials obtained by standard hydrolysis-polycondensation (FIG. 4b, curve "6/TBAF50%").

Example 6

Thin films were prepared as in Example 3, but in a thickness of 170 nm.

Figure 5:
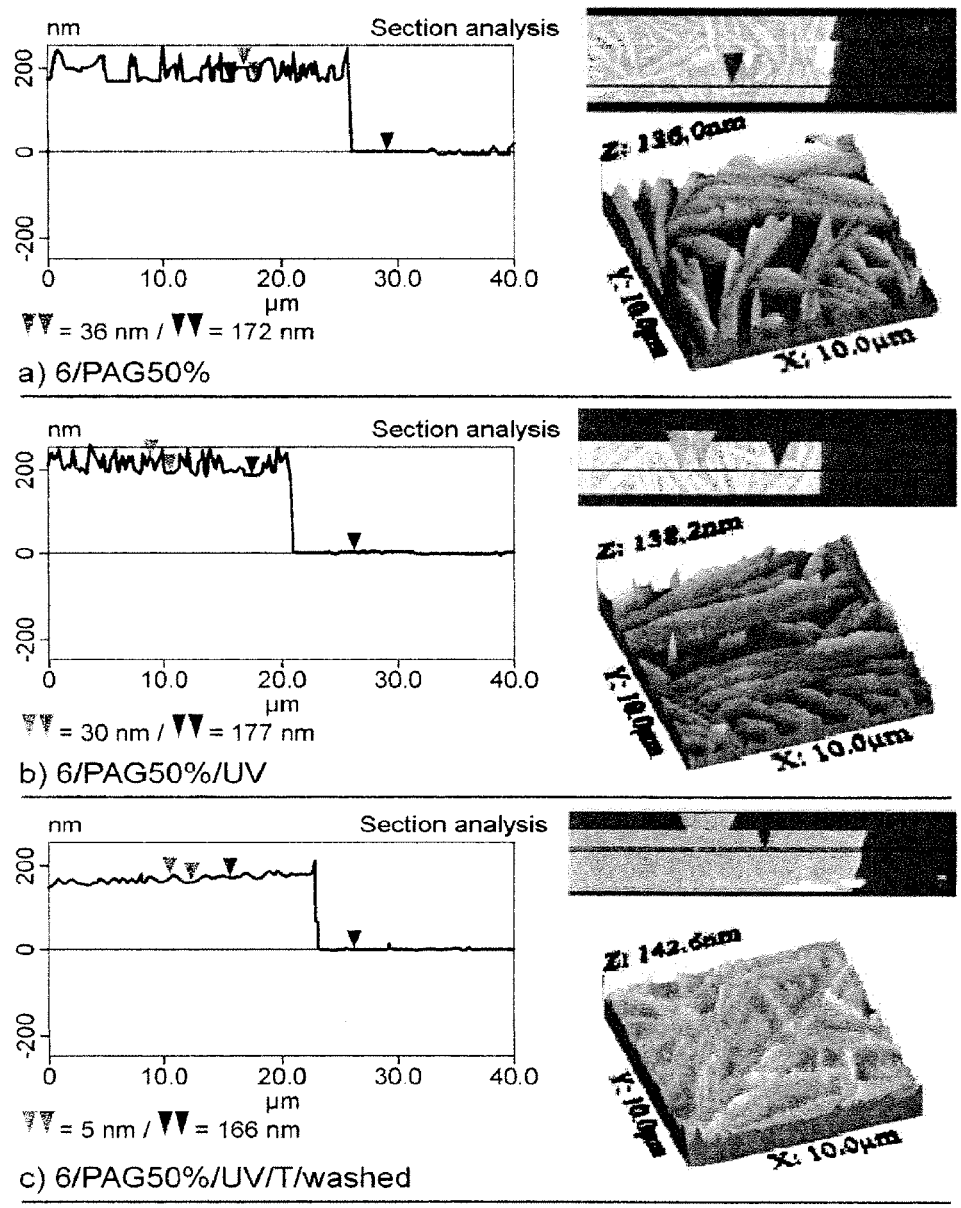
FIG. 5 depicts various film topographies by atomic force microscopy (AFM) and changing morphology at various steps of the process. 5a) depicts a film of 6 (30 mg/mL) and 0.5 eq. of PAG freshly applied by spin-coating on a silicon wafer; 5b) depicts UV irradiation of the film; 5c) depicts the effects of washing the film with various solvents.

Observation of the topography by AFM of a film of 6/PAG50%/UV/T/washed 170 nm thick (FIG. 5c) demonstrated a nanostructured surface with a roughness of 5 nm. This was surprising given the fact that the films obtained via the standard sol-gel route (HCl or TBAF vapors) are perfectly uniform and smooth. A study of the change in morphology of the film at each step of the photochemical hydrolysis/polycondensation process made it possible to determine the origin of this nanostructuring (FIGS. 5a, 5b and 5c). Specifically, as may be observed in FIG. 5a, a film of 6 (30 mg/mL) and 0.5 eq. of PAG freshly applied by spin-coating onto a silicon wafer is composed of a homogeneous layer (thickness≈172 nm) on which are resting microcrystals (thickness≈36 nm) (FIG. 5a). UV irradiation of the film does not produce any visible change in the topography (FIG. 5b). Thus, the film of 6/PAG50%/UV is still composed of a homogeneous layer (thickness≈177 nm) on which are resting microcrystals (thickness≈30 nm). A few defects appear on the crystals. However, washing of the film with various solvents (film 6/PAG50%/UV/T/washed, FIG. 5c) produces total disappearance of the crystals, leaving the uniform layer 166 nm thick. The 5 nm roughness that had been attributed to nanostructuring in fact corresponds to the imprint left by the crystals. From the data obtained by the STIR study, which confirms the total removal of the PAG after washing, and from the AFM image of 6 alone (FIG. 1) showing a uniform film, we can reasonably assert that the homogeneous layer corresponds to 6 and that the microcrystals correspond to the PAG.

Example 7

A composite film about 110 nm thick of 6 30 mg/mL and 0.5 eq. of PAG in THF is prepared and is applied to a silicon wafer. The film is applied by spin-coating. A copper grid of 300×75 mesh (holes of 63×204 μm) (support used for transmission electron microscopy TEM) was then placed on the film as a mask. The grid was held in position by placing a glass slide over the assembly.

Irradiation was performed using a broad-band UV lamp (200-600 nm, 150 mW/cm$^2$). It was performed by filtering out the far UV (<300 nm) and by supplying 100 mJ/cm$^2$.

After irradiation, the TEM grid was removed. The film was annealed at 60° C. for 10 minutes and developed by washing with THF, with acetone and with ethanol. Only the unexposed precursor was dissolved.

Figure 6A:
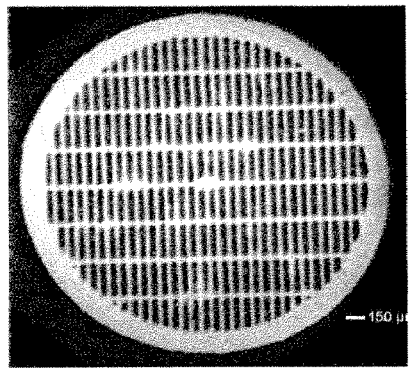
FIG. 6A depicts a patterned film observable under white light microscopy.
Figure 6B:
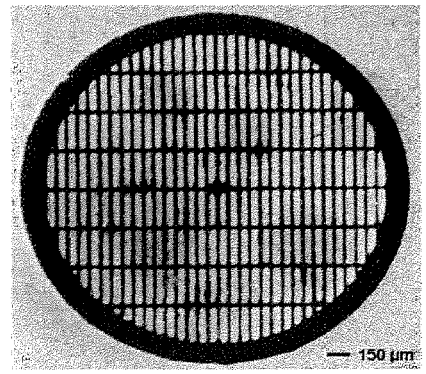
FIG. 6B depicts a patterned film observable under fluorescence microscopy.
Figure 8:
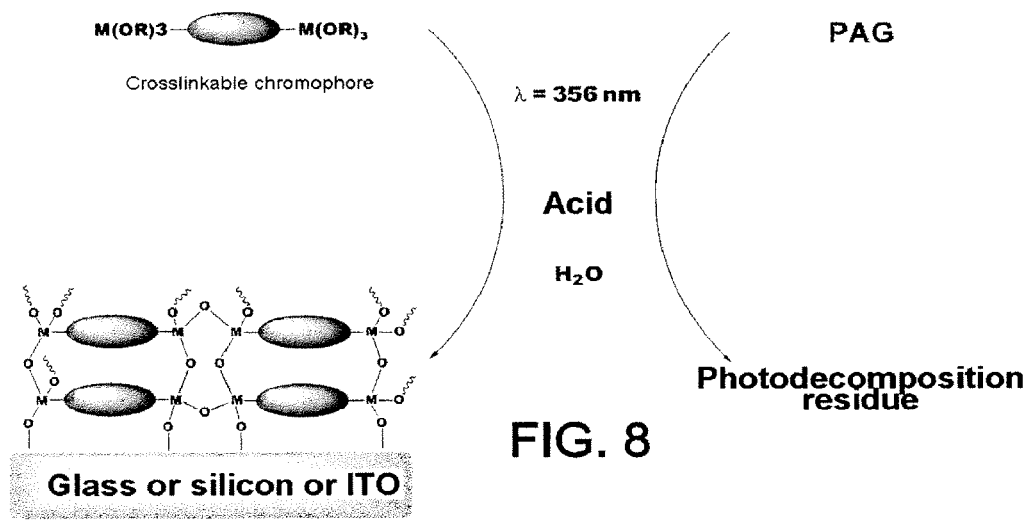
FIG. 8 depicts an embodiment of a hydrolysis-polycondensation process reaction scheme The photoacid generator (PAG) is photodecomposed under UV irradiation and releases an acid that allows the hydrolysis-polycondensation of the chromophore. The hydrolysis-polycondensation process in accordance with the invention may be represented by the reaction scheme given in FIG. 8.

The pattern obtained is observed by white-light microscopy (FIG. 6a) and by fluorescence microscopy (FIG. 6b). The pattern is produced uniformly on a surface 3 mm in diameter. The photolithographed pixels remain highly fluorescent.

Figure 7A:
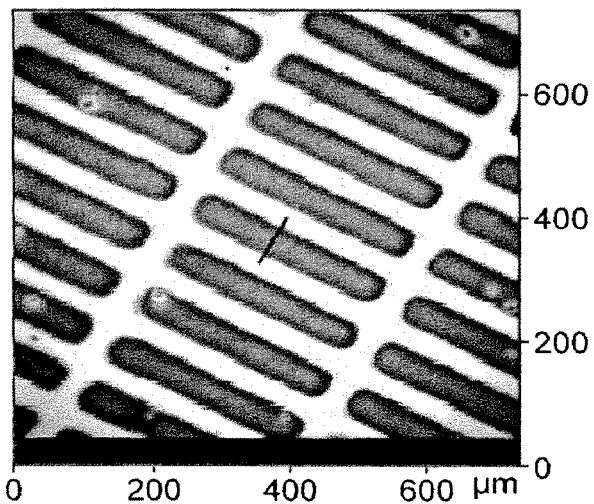
FIG. 7A depicts the topographic image of a pixel by AFM
Figure 7B:
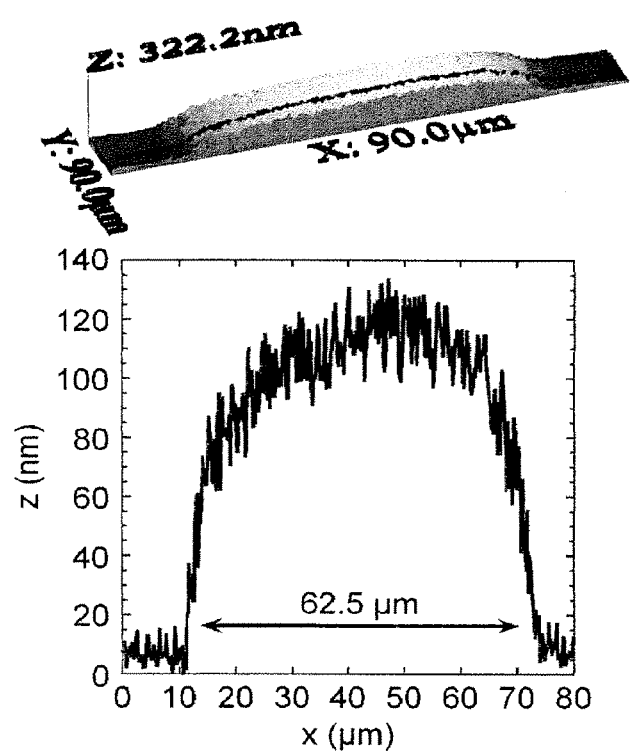
FIG. 7B depicts the topographic profile of the pixel shown in FIG. 7A.

The topographic image of a pixel by AFM is given in FIG. 7a and the corresponding topographic profile is given in FIG. 7b.

The dimensions of the pixels obtained by photolithography correspond to the dimensions of the rectangular holes of the grid. The imprint left by the PAG crystals may be observed on the profile of a pixel (FIG. 7b).

[1] a) C. Sanchez, B. Lebeau, F. Chaput, J.-P. Boilot, *Adv. Mater,* 2003, 15, 1969 and references therein; b) B. Dunn, J. D. Mackenzie, J. I. Zink, O. M. Stafsudd, *Proc. SPIE int. Soc. Opt. Eng.,* 1990, 1328, 174; c) J. B. Mac Chesnay, *Proc. SPIE int. Soc. Opt. Eng.,* 1989, 988, 131; d) R. Reisfeld, C. K. Jorgensen, *Struct. Bonding,* 1982, 49, 1.

[2] a) K. J. Shea, D. A. Loy, O. W. Webster, *J. Am. Chem. Soc.,* 1992, 114, 6700; b) R. J. P. Corriu, J. J. E. Moreau, P. Thepot, M. Wong Chi Man, *Chem. Mater.,* 1992, 4, 1217; c) R. J. P. Corriu, P. Hesemann, G. F. Lanneau, *Chem. Commun.,* 1996, 1845; d) P. N. Prasad, *Mater. Res. Soc. Symp. Proc.,* 1990, 180, 741.

[3] T. Dantas de Morais, F. Chaput, K. Lahlil, J-P. Boilot, *Adv. Mater.,* 1999, 11, 107.

[4] M. Schneider, J. Hagen, D. Haarer, K. Müllen, *Adv. Mater.,* 2000, 12, 351.

[5] a) O. Haruyuki, S. Koichi, T. Masahiro, S. Masamitsu, F. Tsuyoshi; K. Shinichi, Y. Mitsuaki, *J. Photopolym. Sci. Tec.* 2003, 16, 87 and references therein; b) A. Rikako, N. Yoshihiko, Y. Hiroshi, M. Satoshi, H. Shuzi, *J. Polym. Sci., Pol. Chem.,* 1997, 35, 2355.

[6] J. Yu, M. Abley, C. Yang and S. Holdcroft, *Chem. Commun.,* 1998, 1503.

[7] A. Kowalewska, *J. Mat. Chem.,* 2005, 15, 4997.

[8] a) D. A. Doshi, N. K. Huesing, M. Lu, H. Fan, Y. Lu, K., Jr. Simmons-Potter, A. J. Hurd, C. J. Brinker, *Science,* 2000, 290, 107; (b) Y, Lu, Y. Yang, A. Sellinger, M. Lu, J. Huang, H. Fan, R. Haddad, G. Lopez, A. R. Burns, J. Shelnutt, C. J. Brinker, *Nature,* 2001, 410, 913.

[9] G. Wantz, O. J. Dautel, R. Almairac, L. Hirsh, F. Serein-Spirau, L. Vignau, J.-P. Lere-Porte, J. P. Parneix, J. J. E. Moreau, *Org. Elec.,* 2006, 7, 38.

[10] O. J. Dautel, G. Wantz, R. Almairac, D. Flot, L. Hirsh, J.-P. Lere-Porte, J. P. Parneix, F. Serein-Spirau, L. Vignau, J. J. E. Moreau, *J. Am. Chem. Soc.,* 2006, 128, 4892.

[11] J. P. Malval, F. Morlet-Savary, X. Allonas, J.-P. Fouassier, S. Suzuki, S. Takahara, T. Yamaoka, *Chem. Phys. Letters,* 2007, 443, 323.

The invention claimed is:

1. A process for the hydrolysis-polycondensation of a sterically hindered crosslinkable fluorescent chromophore, wherein the hydrolysis-polycondensation is catalyzed with an acid released by a photoacid generator (PAG).

2. The process according to claim 1, wherein the sterically hindered crosslinkable fluorescent chromophore comprises two sterically hindered groups.

3. The process according to claim 2, wherein the sterically hindered groups are chosen from the group comprising:

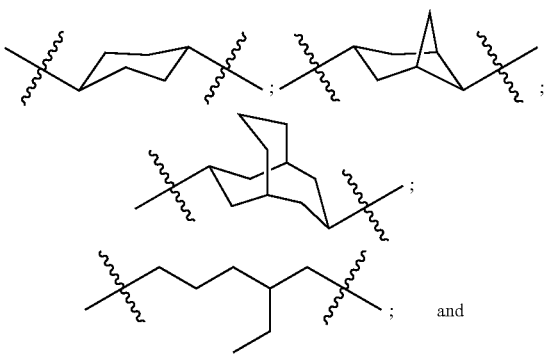

-continued

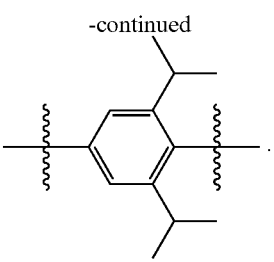

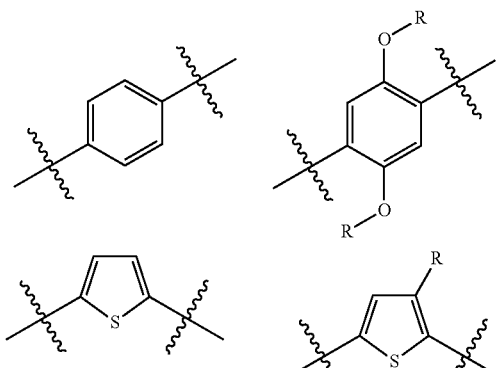

4. The process according to claim 3, wherein the sterically hindered crosslinkable fluorescent chromophore comprises two identical sterically hindered groups.

5. The process according to claim 1 wherein the sterically hindered crosslinkable fluorescent chromophore is chosen from those having the formulae below:

formula (I):

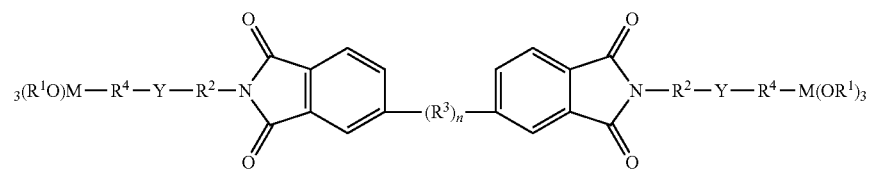

formula (II):

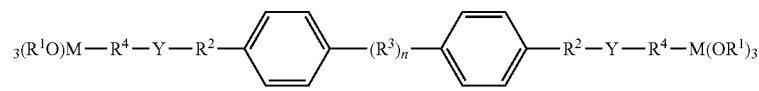

in which $R^1$ represents $C_1$-$C_4$ alkyl;

$R^2$ represents a sterically hindered group, chosen from the group comprising:

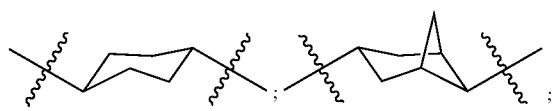

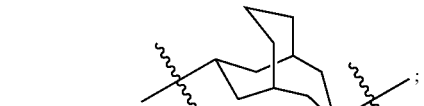

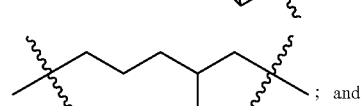; and

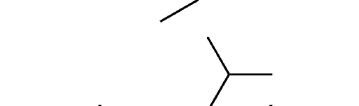

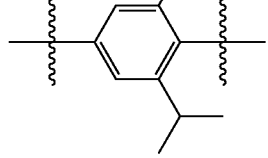

$R^3$ represents a pi-conjugated system, preferably chosen from the group comprising -continued

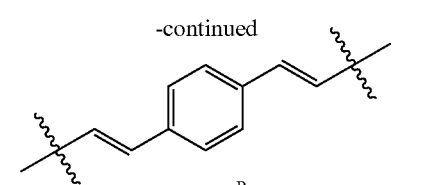

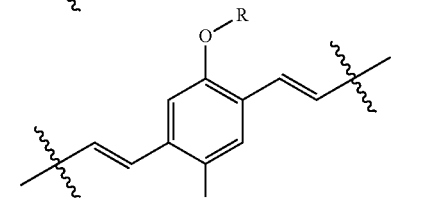

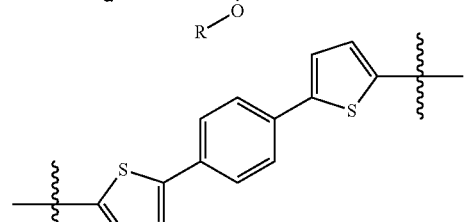

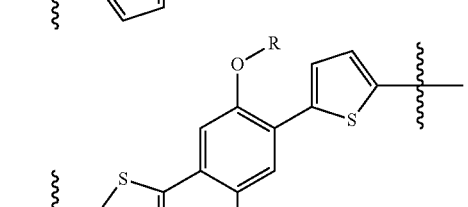

with R representing H or a $C_1$-$C_{18}$ alkyl group, said alkyl group being optionally branched or substituted with a heteroatom (O, S, N, etc.);

Y represents O, S or NH or is absent;

$R^4$ represents a $C_3$-$C_{18}$ alkyl group;

M represents a metal from group III or IV of the Periodic Table; and n is an integer.

6. The process according to claim 1, wherein the photo-acid-generating catalyst is chosen from the group comprising fluoroalkylsulfonyloxy derivatives and iodonium salts.

7. The process according to claim 6, wherein the fluoroalkylsulfonyloxy derivatives are chosen from the group comprising N-trifluoro methylsulfonyloxy-1,8-naphthamide (NIOTf) of formula:

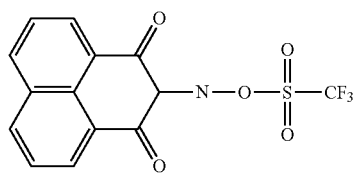 [SMILES: O=C1c2cccc3cccc(c23)C(=O)C1NOS(=O)(=O)C(F)(F)F]

the NIOTf derivatives of formulae:

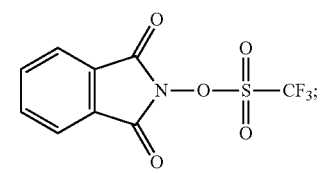

PIT

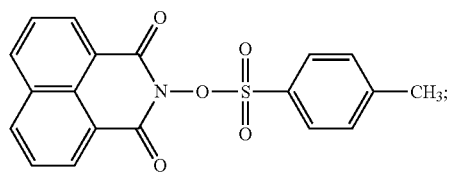

NITos

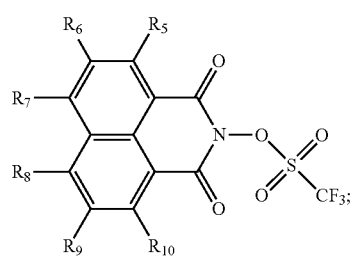

formula (A)

with $R_5$ to $R_{10}$, independently of each other, possibly being chosen from: H; $CH_3$; $C_5$ to $C_{20}$ alkyl; (linear $C_1$ to $C_4$ alkyl)-C≡C—; ($C_1$ to $C_4$ alkyl)$_2$-CH—C≡C—; ($C_1$ to $C_4$ alkyl)$_3$-C—C≡C—; ($C_1$ to $C_4$ alkyl)$_3$-Si—C≡C—; and other compounds of formulae:

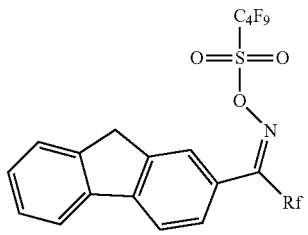

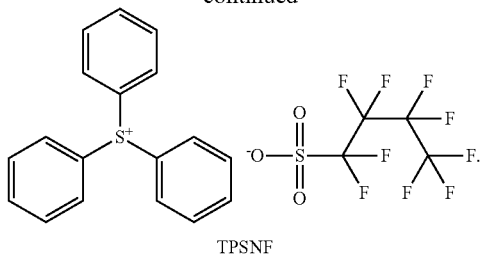

TPSNF

| Rf | |
|---|---|
| -$C_3F_7$ | HNBF |
| -$C_4F_8H$ | ONPF |
| -$C_6F_{12}H$ | DNHF |

8. The process according to claim 7, wherein the PAG is the TIPSA-NIOTf, of formula:

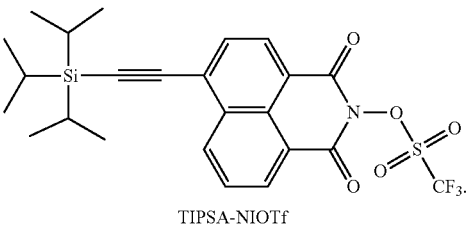 [SMILES: CC(C)[Si](C#Cc1ccc2c3c(cccc13)C(=O)N(OS(=O)(=O)C(F)(F)F)C2=O)(C(C)C)C(C)C]

TIPSA-NIOTf

9. The process according to claim 6, wherein the iodonium salts are chosen from the group comprising $Ph_2IB(C_6H_5)_4$, $Ph_2IOSO_2CF_3$, $Ph_2ISbF_6$, $Ph_2IBF_4$, and mixtures thereof.

10. The process according to claim 1, wherein the sterically hindered crosslinkable fluorescent chromophore is applied to a support chosen from the group comprising glass, silicon and tin-doped indium oxide or ITO (Indium Tin Oxide).

11. The process according to claim 1 wherein the amount of PAG is between 0.01% and 100%, the percentages being molar percentages relative to the number of moles of crosslinkable chromophore.

12. The process according to claim 1, wherein the amount of PAG of formula (A) is between 0.01% and 50%, the percentages being molar percentages relative to the number of moles of crosslinkable chromophore.

13. The process according to claim 1, wherein the process comprises the following steps:
   selection of a support;
   application of the sterically hindered fluorescent crosslinkable chromophore to one face of the support;
   application of the PAG to said face of the support;
   UV irradiation;
   optionally, annealing;
   optionally, removal of the unreacted PAG and of its decomposition products.

14. The process according to claim 13, wherein the application of the sterically hindered crosslinkable fluorescent chromophore takes place by spin-coating.

15. A photolithography process comprising the steps of:
   selection of a support;
   application of the sterically hindered crosslinkable fluorescent chromophore and of the PAG to one face of the support;

application of a mask to the face of the support comprising the fluorescent chromophore and the PAG;
UV irradiation allowing hydrolysis-polycondensation of the sterically hindered crosslinkable fluorescent chromophore as claimed in claim 1;
optionally, annealing;
removal of the PAG and of its decomposition products and of the unreacted crosslinkable fluorescent chromophore.

16. A composition comprising a sterically hindered crosslinkable fluorescent chromophore chosen from those having the formulae below:

formula (I):

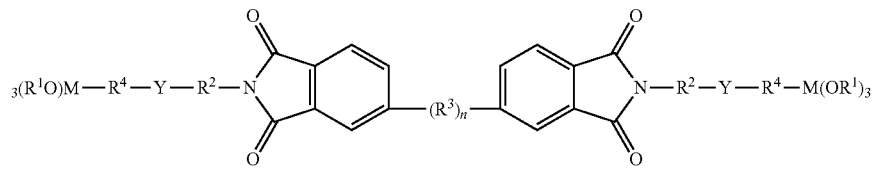

formula (II):

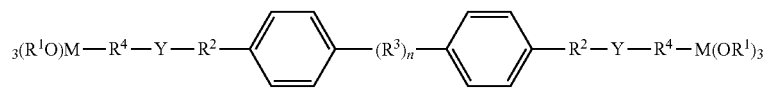

in which
R$^1$ represents C$_1$-C$_4$ alkyl;
R$^2$ represents a sterically hindered group chosen from the group comprising:

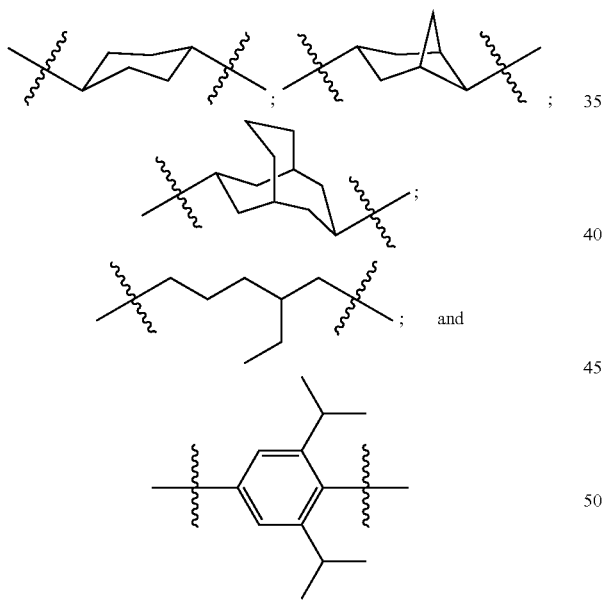

R$^3$ represents a pi-conjugated system chosen from the group comprising

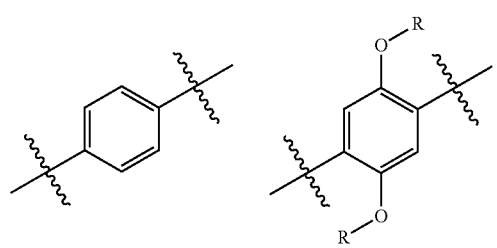

-continued

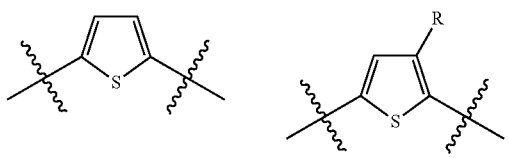

-continued

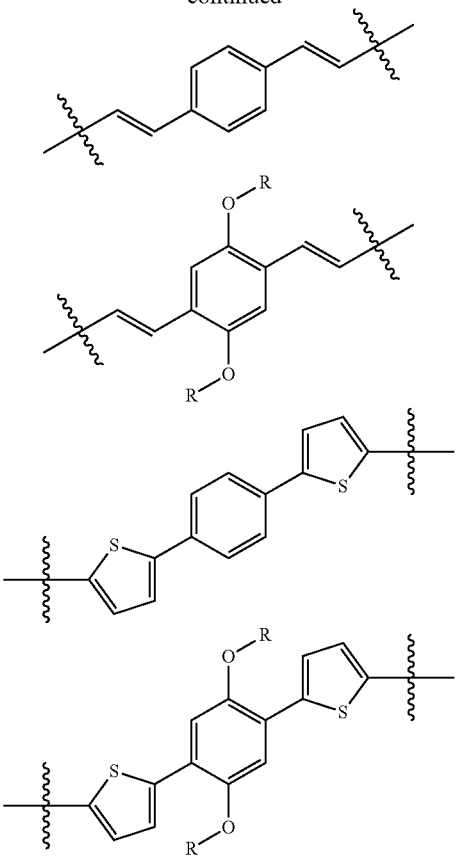

with R representing H or a C$_1$-C$_{18}$ alkyl group, said alkyl group being optionally branched or substituted with a heteroatom;
Y represents O, S or NH or is absent;
R$^4$ represents a C$_3$-C$_{18}$ alkyl group;
M represents a metal from group III or IV of the Periodic Table;
n is an integer, and a photoacid generator (PAG) chosen from the group comprising fluoroalkylsulfonyloxy derivatives and iodonium salts.

17. The composition according to claim 16, wherein said composition contains a solvent chosen from the group comprising THF, dioxane, acetone, methyl ethyl ketone, dichloromethane, hexane, cyclohexane, ethanol, and mixtures thereof.

* * * * *

UNITED STATES PATENT AND TRADEMARK OFFICE
CERTIFICATE OF CORRECTION

| | | |
|---|---|---|
| PATENT NO. | : 8,722,318 B2 | Page 1 of 1 |
| APPLICATION NO. | : 13/063892 | |
| DATED | : May 13, 2014 | |
| INVENTOR(S) | : Dautel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this
Seventh Day of June, 2016

Michelle K. Lee
*Director of the United States Patent and Trademark Office*